2,996,441
RADIOLYTIC POLYMERIZATION OF CYCLOPENTADIENE
Joseph F. Nelson, Westfield, and James E. Shewmaker, Fanwood, N.J., assignors to Esso Research and Engineering Company, a corporation of Delaware
No Drawing. Filed Jan. 29, 1957, Ser. No. 636,848
11 Claims. (Cl. 204—154)

This invention relates to polymerization of cyclopentadiene by radiolysis. It is more particularly concerned with the polymerization of cyclopentadiene and its homologues under select conditions of temperature, phase and dosage to obtain a product of useful molecular weight.

In brief compass, this invention proposes a polymerization process which comprises irradiating a compound selected from the group consisting of cyclopentadiene, alkyl homologues of cyclopentadiene and mixtures thereof, in liquid phase, at a temperature in the range of $-85°$ to $30°$ C. with high energy ionizing radiation until 0.001 to 10 KWH of radiant energy per pound of product have been absorbed.

In a particularly preferred process, the polymerization is carried out in the absence of free oxygen. The monomer can be in a solvent or can be polymerized in bulk.

While it has been known to polymerize cyclopentadiene, it has been difficult to obtain useful products. The product obtained is brittle and otherwise undesirable and usually cannot be processed into useful forms. When using a Friedel-Crafts catalyst, excessive cross-linking is obtained and the product is difficultly soluble or insoluble in solvents.

The present invention proposes a novel method of obtaining cyclopentadiene polymers of the desired molecular weight by radiolysis. Surprisingly good product characteristics are obtained and these are attributed not only to the use of high energy ionizing radiation, but also to the select conditions, principally temperature, used for carrying out the polymerization. At temperatures higher than the desired temperatures, excessive thermal dimerization occurs and this results in poor product characteristics.

This invention also has the advantage that the product obtained is not contaminated by catalysts or other prior art polymerization aids. Because the polymerization is induced almost solely by radiation, the characteristics of the product are readily and easily controlled.

The product of this invention is useful as a cross-linking agent, as a drying oil or constituent thereof, as a film forming medium, as a lacquer component, and the like. The films formed from polymers of cyclopentadiene and its homologues bake very rapidly and are surprisingly flexible.

The principal feed stock of this invention is cyclopentadiene or its homologues, well known in the art. The term "cyclopentadiene homologues" as here used includes only those closely related alkyl homologues wherein the alkyl group contains 1 through 6 carbon atoms, such as methyl cyclopentadiene, di-methyl cyclopentadiene, ethyl cyclopentadiene, propyl cyclopentadiene and other alkylated cyclopentadienes. Mixtures of these monomers can be converted.

It is preferred in some cases to carry out the radiolysis without a solvent, although a solvent substantially inert to radiation, such as hexane, cyclohexane, benzene, low boiling petroleum fractions and similar materials can be used. This latitude in the use of solvents permits more ready control of the product characteristics and can be used to prevent deposition of polymeric products in the reaction vessels. The solvent used can be one that will later serve as a vehicle to dispense or carry the polymeric product. When using a solvent, preferably, 10 to 90 wt. percent of the reaction mixture is solvent.

In another modification of this process, the unsaturated feed components are irradiated in the form of aqueous emulsions. Known emulsifying agents and conventional techniques are employed to produce the emulsion systems.

This invention also contemplates the copolymerization of minor amounts of other types of monomers to impart specific characteristics to the polymeric product. A minor amount, i.e., 0.5 to 25 wt. percent, of another monomer can be incorporated into the feed stock to impart specific product characteristics such as greater flexibility, increased toughness or decreased permeability of the solid film-forming products or higher viscosity index in liquid or products produced at higher temperatures and very high dose rates. Suitable monomers for this use are terminally unsaturated monomers, such as ethylene, propylene, the butenes, other lower alpha olefins, diolefins, such as butadiene and styrene.

The radiolysis of the feed or feed mixture is carried out by exposing it either continuously or batchwise to irradiation. For example, when a nuclear reactor is used, the mixture can simply be flowed through, in, or around the core in suitable conduits, being exposed thereby to neutrons and gamma irradiation.

By the term "high energy ionizing radiation" is meant irradiation from terrestrial sources consisting of photons having a wave length less than 50 A., such as gamma and X-rays, rapidly moving charged or uncharged particles of an atomic or subatomic nature having an energy above 30 ev., such as alpha particles and beta rays, and neutrons, of sufficient intensity that the dose rate is at least 0.01 KWH/hr./lb. of product. This excludes radiations, such as cosmic and ultraviolet which are ineffectual for the purposes of this invention. It is preferred to use essentially gamma or beta radiation because of the safety and ease of control. So far as known, the characteristics of the product are not significantly influenced by the type of irradiation, but only primarily by the dose rate, total dosage and conditions under which the radiation is received.

The irradiation is obtained from any convenient source such as: charged particle accelerators, e.g., Van de Graaff generators and X-ray machines; nuclear reactors, e.g., atomic piles; radioactive waste products, e.g., spent fuel elements from nuclear reactors; and materials especially made radioactive, e.g., cobalt 60 and cesium 137. The use of radioactive isotopes is especially convenient.

The irradiation of the monomer is preferably carried out in liquid phase. It is essential that the temperature be in the range of about $-85°$ to about $30°$ C. The dosage received is at least 0.001 and usually not more than 10 KWH/lb. of polymer produced. It is also much preferred that the irradiation be carried out in the substantial absence of free oxygen, i.e., less than 0.1 wt. percent of free oxygen. For best results the dose rate for all types of irradiation, whether mixed or pure, should be at least 0.01 KWH/hr./lb. of product to produce a favorable rate of polymerization. The product obtained has a Staudinger molecular weight in the range of 500 to 100,000.

The product obtained from the radiolysis can be distilled to concentrate the polymer if desired. In one embodiment of this invention, the polymeric product is catalytically hydrogenated to improve its properties. Conventional hydrogenation catalysts are used to accomplish this, such as platinum oxide, cobalt, and/or molybdate catalysts, Raney nickel, supported platinum catalysts and the like. The hydrogenation is carried out at pressures in the range of 15 to 2,000 p.s.i.g. and temperatures in the range of $-10°$ to $250°$ C. It is preferred to carry out the hydrogenation until 0.5 to 1 mole of hydrogen per cyclopentadiene unit in the polymer is absorbed.

The polymer obtained by the radiolysis is preferably carried in a suitable solvent such as identified above until used. It can be used to form very desirable protective films on surfaces, such as paper, cloth, plastics, wood, ceramics and metals, either by air-drying and/or baking. Specifically, the polymeric product of this invention is useful as a metal can coating, as a paint and lacquer ingredient, as a paper and cardboard coating, as a nail polish ingredient and as a protective covering for wounds. When the amount of radiation is sufficient to form solids, form-stable useful articles are obtained.

EXAMPLE 1

86 grams of freshly distilled cyclopentadiene monomer (96% pure) were placed into a 150 ml. stainless steel bomb. The bomb and its contents were kept at 0° C. or lower before and during the radiolysis by being immersed in ice and water. Over a period of 68 hours this sample was given 16 megaroentgens of gamma irradiation from a cobalt 60 source in the form of a 2 inch O.D. hollow pipe, having a rating of about 2,700 curies. The bomb was placed about 3 inches from the vertical axis of the source. After irradiation, the sample was diluted with 360 ml. of cyclohexane and kept frozen to prevent possible degradation by oxygen uptake upon exposure to air.

One portion of the cyclohexane solution of the product polymer was hydrogenated batchwise with a platinum oxide catalyst. The polymer dissolved in cyclohexane was placed with 0.9 gram of platinum oxide catalyst in a glass reactor. The vessel was charged with hydrogen at 60 p.s.i. and shaken at 15° C. for 15 minutes, about 1,800 std. cu. ft. of hydrogen being absorbed per pound of pure polymer. After 15 minutes, the reaction appeared to be complete as shown by the constancy of pressure at 33 p.s.i.g.

The system was then brought to 60° C. and further shaken at this temperature for 4 hours to insure completion of the hydrogenation. During this period, no additional hydrogen was absorbed.

Following hydrogenation, the solvent and unreacted cyclopentadiene were stripped from the polymer using conventional laboratory distillation equipment.

In contrast to the ease of hydrogenation of the radiation-produced polycyclopentadiene, polymers produced by prior art catalysis (Friedel-Crafts) require temperatures above 200° C., hydrogen pressures in the vicinity of 1,000–2,000 p.s.i. and are usually carried out for 8 or more hours. The difficulty of hydrogenating prior art polycyclopentadienes has generally been ascribed to the halide catalyst residues. These are completely eliminated in the present invention.

A yield of about 6 grams of hard polymer was obtained from this hydrogenation. Calculated on the basis of total product, this amounted to about 10 wt. percent yield on the original cyclopentadiene irradiated.

EXAMPLE 2

A small amount of the total product as received from the bomb in Example 1 was applied to a smooth plastic surface. It readily dried in about 2 minutes to a glossy tough film which adhered very tenaciously.

EXAMPLE 3

A small amount of the irradiated product dissolved in the cyclohexane from Example 1 was placed on a tin plate and baked for 5 minutes at 375° F. The resulting film was very clear and had a thickness of about 0.2 mil. The hardness of the film was equivalent to a 7H pencil and showed no signs of failure or weakness when crimped in a ⅛ inch rod flex test. This test is used in the protective coating of metals field to measure the flexibility of the films, i.e., their ability to withstand drastic deformation without breaking or tearing. In the test the film-bearing metal is quickly creased by bending it over a ⅛ inch diameter metal rod. The film is then inspected visually for cracks or imperfections.

This flexibility of the film formed from the cyclopentadiene polymer is one of the surprising features of this invention. It appears that in the method of this invention, a different type of polymeric structure is obtained than is obtained in known prior art cyclopentadiene polymerization processes because the prior art polymers form extremely brittle films.

EXAMPLE 4

3.6 wt. percent of the hydrogenated polycyclopentadiene described in Example 1 was dissolved in a solvent refined naphthenic lubricating base oil. The viscosity index of this solution was surprisingly higher than any of a large number of hydrogenated polycyclopentadienes made by the use of prior art (Friedel-Craft) catalysts, such as $SnCl_4$, $BF_3$ etc. This is shown in Table I.

*Table I*

| | Viscosities, SSU | | V.I. |
|---|---|---|---|
| | 100° F. | 210° F. | |
| Base oil | 113.3 | 9.78 | 62 |
| Base oil plus 3.6% of the hydrogenated polycyclopentadiene of this invention | 292.8 | 21.42 | 95 |
| Range of values for base oil plus a variety of hydrogenated polycyclopentadienes made with Friedel-Crafts catalysts | | | 69–84 |

Having described this invention, what is sought to be protected by Letters Patent is succinctly set forth in the following claims.

What is claimed is:

1. A polymerization process which comprises irradiating a compound selected from the group consisting of cyclopentadiene, alkyl homologues of cyclopentadiene and mixtures thereof, in liquid phase, in the substantial absence of free oxygen and at a temperature in the range of −85° to 30° C. with high energy ionizing radiation equivalent to at least 30 electron volts until 0.001 to 10 KWH of radiant energy per pound of polymeric product have been absorbed and recovering a polymeric product having a molecular weight in the range of 500 to 100,000 Staudinger.

2. The process of claim 1 wherein said compound is dissolved during irradiation in about 10 to 90 wt. percent of inert solvent, and said polymeric product is recovered in solution.

3. A polymeric material produced by irradiating a compound selected from the group consisting of cyclopentadiene, alkyl homologues of cyclopentadiene and mixtures thereof, in liquid phase, in the substantial absence of free oxygen and at a temperature in the range of −85° to 30° C. with high energy ionizing radiation equivalent to at least 30 electron volts until 0.001 to 10 KWH of radiant energy per lb. of polymeric material have been absorbed.

4. The polymeric material of claim 3 having a Staudinger molecular weight in the range of 500 to 100,000.

5. The polymeric material of claim 4 when said compound is carried in about 10–90% of an inert solvent during said irradiation.

6. A film formed from the polymeric material of claim 3 by drying on a surface.

7. The polymeric material of claim 3 when said compound is cyclopentadiene.

8. The polymeric material of claim 3 characterized by its ability to form a flexible film that passes the ⅛ inch rod flex test when baked in the presence of free oxygen in the form of a film.

9. The polymeric material of claim 8 when said compound is cyclopentadiene.

10. The polymeric material of claim 3 characterized by its ability to take up easily in the range of 0.5 to 1 mole of free hydrogen per monomer unit in the presence of a hydrogenation catalyst.

11. The polymeric material of claim 3 when hydrogenated with in the range of 0.5 to 1 mole of free hydrogen per monomer unit in the polymeric material, the hydrogenated material, when dissolved in 3.6 wt. percent concentration in a solvent refined naphthenic lubricating base oil, giving a higher viscosity index than the corresponding polymer at the same concentration produced with a Friedel-Crafts catalyst in the absence of radiation.

References Cited in the file of this patent

UNITED STATES PATENTS 2,689,240    Gerhart _____ Sept. 14, 1954

FOREIGN PATENTS 665,262    Great Britain _____ Jan. 23, 1952

OTHER REFERENCES

Tolbert et al.: Radiation Research, vol. 3, No. 1, pp. 52–76, September 1955.

Collinson et al.: "Chemical Reviews," vol. 56, No. 3, pp. 473–484, 553–568, June 1956.

Heisig: "J. Phys. Chem.," vol. 39, pp. 1067–1072 (1935).

Schoepfle et al.: "I. and E. Chem.," vol. 23, No. 12, pp. 1396–1398, December 1931.

Starkweather et al.: "I. & E. Chem.," vol. 39, page 210 (1947).

Sun: "Modern Plastics," vol. 32, No. 1, pages 232–233, September 1954.